United States Patent
Dodson et al.

(10) Patent No.: US 9,128,834 B2
(45) Date of Patent: Sep. 8, 2015

(54) IMPLEMENTING MEMORY MODULE COMMUNICATIONS WITH A HOST PROCESSOR IN MULTIPORTED MEMORY CONFIGURATIONS

(71) Applicant: International Business Machines Corporation, Armonk, NY (US)

(72) Inventors: John S. Dodson, Austin, TX (US); Luis A. Lastras-Montano, Cortlandt Manor, NY (US); Warren E. Maule, Cedar Park, TX (US); Adam J. McPadden, Underhill, VT (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/034,731

(22) Filed: Sep. 24, 2013

(65) Prior Publication Data

US 2015/0089279 A1 Mar. 26, 2015

(51) Int. Cl.
*G11C 29/00* (2006.01)
*G06F 11/07* (2006.01)
*G06F 11/10* (2006.01)

(52) U.S. Cl.
CPC .......... *G06F 11/073* (2013.01); *G06F 11/1048* (2013.01)

(58) Field of Classification Search
None
See application file for complete search history.

(56) References Cited

U.S. PATENT DOCUMENTS

| | | | |
|---|---|---|---|
| 6,683,372 B1 | 1/2004 | Wong et al. | |
| 7,636,833 B2 | 12/2009 | Tremaine | |
| 7,650,457 B2 | 1/2010 | Ruckerbauer | |
| 8,099,651 B2 | 1/2012 | Normoyle et al. | |
| 8,245,109 B2 | 8/2012 | Wickeraad et al. | |
| 2004/0088636 A1* | 5/2004 | Cypher | 714/764 |
| 2004/0205433 A1* | 10/2004 | Gower et al. | 714/733 |
| 2005/0044302 A1 | 2/2005 | Pauley et al. | |
| 2010/0217915 A1* | 8/2010 | O'Connor et al. | 711/5 |

OTHER PUBLICATIONS

Anonymously IBM TDB. "Corruption-Resistant Data Porting with Multiple Error Correction Schemes", Oct. 2006, IPCOM000141804D.
Yoon, D. H. et al., "Virtualized ECC: Flexible Reliability in Main Memory", Micro, Feb. 2011, 31(1), IEEE.

* cited by examiner

*Primary Examiner* — Daniel McMahon
(74) *Attorney, Agent, or Firm* — Joan Pennington

(57) ABSTRACT

A method, system and computer program product are provided for implementing ECC (Error Correction Codes) memory module communications with a host processor in multi-ported memory configurations in a computer system. Each of multiple memory modules operating in unison is enabled to identify which memory module is the one required to communicate module specific information back to the host processor. All of the multiple memory modules operating in unison are enabled to generate back to the host processor a valid ECC word, while other multiple memory modules individually being unaware of data contents of the one memory module required to communicate back to the processor.

10 Claims, 7 Drawing Sheets

PARITY CHECK MATRIX OF ERROR CONTROL CODE

| H |
|---|
| 300 |

SPLIT PARITY CHECK MATRIX INTO TWO HALVES, ONE FOR EACH PORT A, B

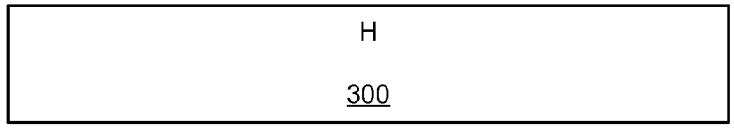

ENCODER CHOOSES WHERE CHECK BITS GO FOR EACH PORT

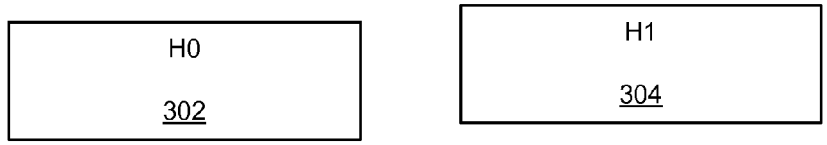

PORT A MODULE ENCODES
VALID ECC WORD      PORT B MODULE REPLIES ZEROS

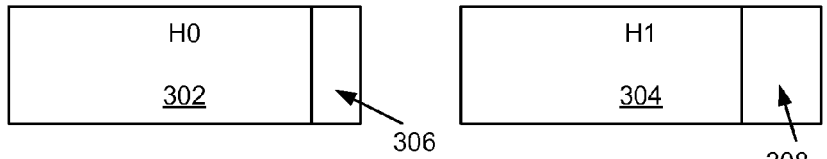

310
FULL RANK

OPTIONAL CHIP MARK CAPABILITY:

PORT A MODULE ENCODES
VALID ECC WORD      PORT B MODULE REPLIES ZEROES

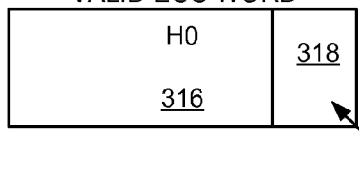 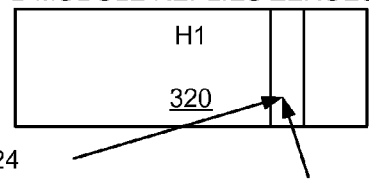

324
FULL RANK

322
MARKED SYMBOLS
(DECODER TREATS AS
DON'T CARE)

FIG. 3A

IMPLEMENTING MEMORY MODULE COMMUNICATIONS WITH A HOST PROCESSOR IN MULTIPORTED MEMORY CONFIGURATIONS

FIELD OF THE INVENTION

The present invention relates generally to the data processing field, and more particularly, relates to a method, system and computer program product for implementing ECC (Error Correction Codes) memory module communications with a host processor in multi-ported memory configurations in a computer system.

DESCRIPTION OF THE RELATED ART

ECC (Error Correction Codes) are used to detect and correct errors introduced during data storage or transmission. Certain kinds of memory, such as some random access memory (RAM) chips and other memory modules inside a computer implement ECC techniques to correct data errors and are known as ECC memory. ECC memory is used in most computers where data corruption cannot be tolerated under any circumstances, such as for scientific or financial computing and as servers.

When an error correcting equipped memory subsystem is organized so that the word written to memory is split between two ore more ports, the generation of the error correcting code check symbols is provided in a central place that has access to all of the data that is to be stored in memory. In some situations, nonetheless, an individual memory module in a port needs to convey module-specific information (that was not previously stored by the host processor) back to the host processor without communicating with any other memory module. This in principle is impossible to accomplish because of the need to have a central location that has access to all of the information of all ports, which does not exist in the situation being discussed in here. Moreover, a problem is to obtain a solution that requires no changes to the host processor's memory controller. The memory controller could be in the same physical package as the processor or processors that eventually consume this data, or could be in a physically separate package.

A need exists for an effective mechanism to enable enhanced ECC (Error Correction Codes) memory module communications with a host processor in multi-ported memory configurations in a computer system. It is desirable to provide such mechanism that enables use of the memory controller without requiring any change.

As used in the following description and claims, the term multi-ported memory configuration should be broadly understood to include various arrangements of multiple memory channels and multiple memory ports including memory modules.

SUMMARY OF THE INVENTION

Principal aspects of the present invention are to provide a method, system and computer program product for ECC (Error Correction Codes) memory module communications with a host processor in a multi-ported memory configuration in a computer system. Other important aspects of the present invention are to provide such method, system and computer program product substantially without negative effects and that overcome many of the disadvantages of prior art arrangements.

In brief, a method, system and computer program product are provided for implementing ECC (Error Correction Codes) memory module communications with a host processor in a multi-ported memory configuration in a computer system. Each of multiple memory modules operating in unison is enabled to identify which memory module is the one required to communicate module specific information back to the host processor. All of the multiple memory modules operating in unison are enabled to generate back to the host processor a valid ECC word, while other multiple memory modules individually being unaware of data contents of the one memory module required to communicate back to the processor.

In accordance with features of the invention, each of multiple memory modules is assigned a module-specific, pre-determined address range. When the host processor makes a request in a particular module-specific, pre-determined address range, then the rest of the memory modules know that they are not supposed to reply back with their own module-specific information, and instead respond with a pre-agreed constant, for example, all zeros, or some pattern combination of zeros and ones. Another address range where the memory ports operate in unison is also included in the invention as an option for communications with the multiple memory modules.

In accordance with features of the invention, the valid ECC words that can be generated by the all of the memory modules include per-module valid ECC words that have a pre-agreed constant, for example, all zeros in all but N−1 of the memory modules, without requiring any changes to the memory controller. Taking advantage of this feature, the memory module that wants to communicate information back to the processor encodes its data into one of those module-specific valid ECC words. The other memory modules respond with the all zeros pattern, for example, and the entire ECC word appears valid to the memory controller in the host processor; if fact even if a correctable error ensues during the transmission of this entire word, the error decoder in the memory controller will be able to correct it even though this ECC word was not generated by the memory controller and was not generated at a central point In accordance with features of the invention, for example, when employing any Reed-Solomon code (regardless of symbol size) and whenever the number of checks r, for example, r=8 is no larger than the number of symbols in one memory module's ECC word minus 1. Moreover, if we let the number of symbols in a memory module equal m, then the technique can send exactly m-r symbols worth of module-specific data for one ECC word, without any active coordination between the memory modules at the time of sending the information back, and regardless of where the symbols are located.

In accordance with features of the invention, the ECC generation technique is not limited to Reed-Solomon codes. Fundamentally, if one has the (bit-wise) parity check matrix H of an error correcting code so that syndromes are obtained by multiplying H*v, where v is the received bit vector, and the parity check matrix H can be split in M sections, so that H=[H1 H2 . . . . HM], then for the ECC generation technique above to work, the fundamental requirement is that there exists an invertible square submatrix in each of the H1 H2 . . . HM with dimensions equaling the number of rows of H. The columns chosen, for example, in the ith section of the parity check matrix H correspond to the locations where the ith module's check bits can be positioned at the time of sending module-specific information back to the host processor.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3A, 3B and 3C are logic flow charts illustrating example operations for implementing ECC (Error Correction Codes) generation methods in the computer system of FIGS. 1, 2A and 2B in accordance with preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing enhanced ECC (Error Correction Codes) memory module communicating with a host processor in multi-ported memory configurations.

Figure 1:
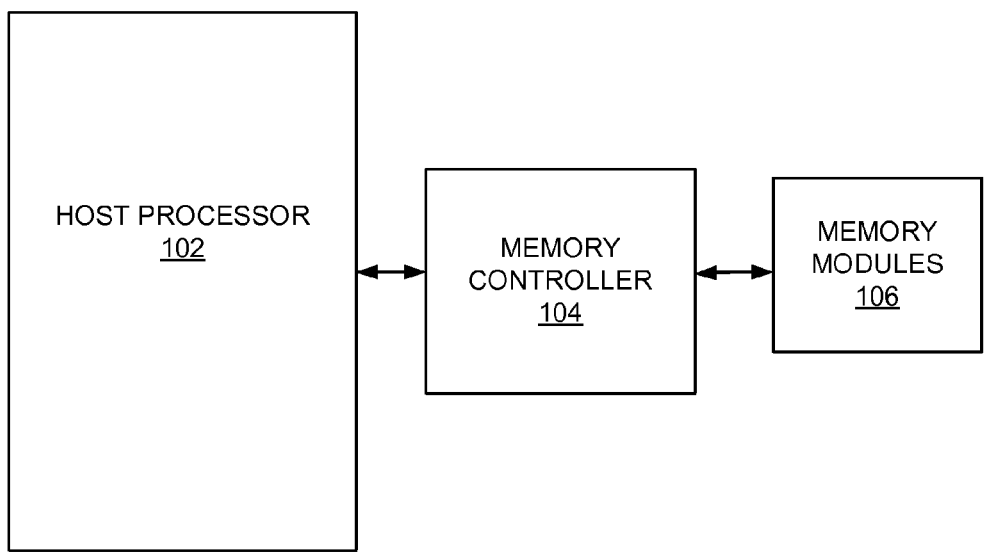
FIGS. 1, 2A and 2B illustrates an example computer system for implementing enhanced ECC (Error Correction Codes) memory module communicating with a host processor in multi-ported memory configurations in accordance with preferred embodiments.
Figure 2A:
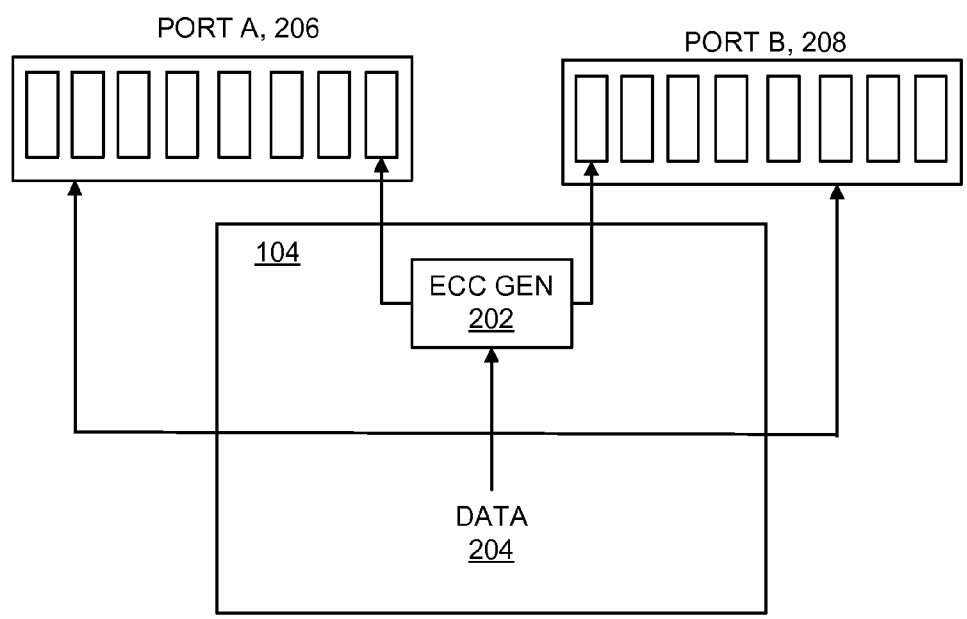
Figure 2B:
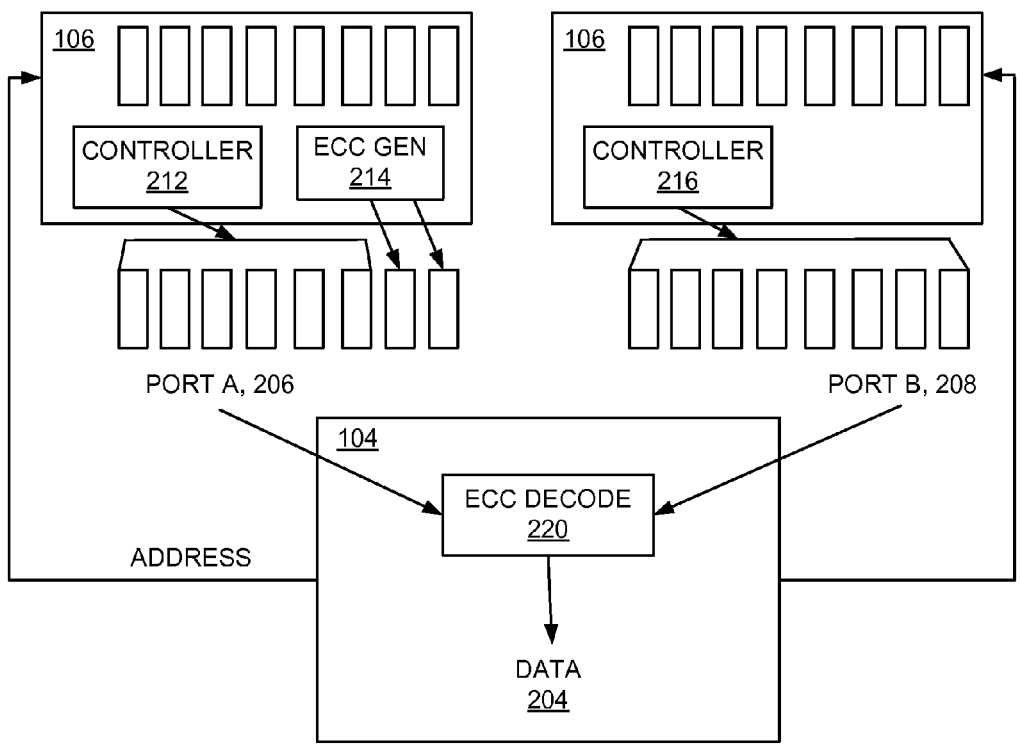

Having reference now to the drawings, in FIGS. 1, 2A, and 2B, there is shown an example computer system generally designated by the reference character 100 for implementing enhanced ECC memory module communications with a host processor in multi-ported memory configurations in accordance with preferred embodiments in accordance with the preferred embodiment.

Computer system 100 includes one or more host processors 102 or programmable central processing units (CPUs) 102 including at least one memory controller 104 coupled to a plurality of memory modules 106, such as Dynamic Random Access Memory (DRAM) modules 106, such as Dual In-line Memory Modules (DIMMs), and memory modules 106 containing flash memory.

In accordance with features of the invention, an individual memory module 106, for example in a port A, 206, or port B, 208 as shown in FIGS. 2B and 2C, is enabled to convey module-specific information back to the host processor 102, that was not previously stored by the host processor 102 without communicating with any other memory module. Further conveying the module-specific information is accomplished without requiring any changes to the memory controller 104.

For example, the enhanced ECC memory module communications in system 100 has applicability in a wide variety of domains, including situations where the memory module 106 has a special capability not found in standard memory modules, and to exploit this capability a method for communicating memory module specific information has to exist. Specific examples include memory modules 106 with flash memory, which due to the fact of not being standard memory (DDR) compliant require a mechanism for conveying status information back to the host processor 102, and accelerators on memory modules 106, which require a mechanism for conveying the result of their work back to the host processor 102, and/or status information as well.

As shown in FIGS. 2A, and 2B, the memory controller 104 includes ECC logic or an ECC generator 202 receiving data 204 and applying data and ECC to a first port A, 206 and a second port B, 208 in an example multi-ported memory configuration of the system 100 with the number of memory ports that operate in unison is N, where N>=2, with two ports shown.

As shown in FIG. 2B, the memory controller 104 provides an address to a selected address range to a respective memory module provided with the first port A, 206 and the second port B, 208.

In accordance with features of the invention, two special purpose address ranges are provided, for example one for the first port A, 206 and one for the second port B, 208. Each of multiple memory modules 106 is assigned a module-specific, pre-determined address range. When the host processor 102 makes a request in a particular module-specific, pre-determined address range, then the rest of the memory modules know that they are not supposed to reply back with their own module-specific information, and instead respond with a pre-agreed constant, for example, all zeros, or some pattern combination of zeros and ones. Another address range where the memory ports operate in unison is also included in the invention as an option for communications with multiple memory modules.

As shown in FIG. 2B, the memory module 106 coupled to the first port A, 206 includes a controller 212 and ECC generator logic or an ECC generator 214 providing data and ECC to the first port A, 206 with the module-specific, pre-determined address range for the first port A, 206. The memory module 106 coupled to the second port B, 208 includes a controller 216 applying the pre-agreed constant, such as all zeros, or some pattern combination of zeros and ones to the second port B, 208. The memory controller 104 includes ECC decode logic or an ECC decode 220 receiving the data and ECC of module-specific data from the first port A, 206 and the pre-defined constant, such as all zeros, or some pattern combination of zeros and ones from the second port B, 208, which together provide the entire valid ECC word which appears perfectly valid to the memory controller 104 in the host processor 102; even if unintended errors, correctable or uncorrectable (as for as the ECC decode 220 is concerned), ensue somewhere between the generation of the module-specific data or the other port's constant pattern, the ECC decode 220 will be able to treat the resulting word as correctable or uncorrectable, respectively, even though the data received by ECC decode 220 was not generated at an single point.

Computer system 100 is shown in simplified form sufficient for understanding the present invention. The illustrated computer system 100 is not intended to imply architectural or functional limitations. The present invention can be used with various hardware implementations and systems and various other internal hardware devices. In particular, the illustration in FIG. 2B is meant to depict the situation where the first memory module 106 to the left is the one that needed to send module-specific information; the other case when the second memory module 106 to the right is the one that needs to send module-specific information can be treated by reversing the picture and discussion.

In accordance with features of the invention, each of multiple memory modules 106 is assigned a module-specific, pre-determined address range. When the host processor 102 makes a request in a particular module-specific, pre-determined address range, then the rest of the modules 106 know that they are not supposed to reply back with their own module-specific information, and instead respond with a pre-agreed constant, for example, all zeros, or some pattern combination of zeros and ones. Another address range where the memory ports operate in unison is also included in the invention as an option.

In accordance with features of the invention, the valid ECC word generated by the all of the memory modules includes per-module valid ECC words that have, for example, all zeros in all but N−1 of the memory modules, without requiring any changes to the memory controller. Thus all that the memory module that wants to communicate information back to the processor encodes its data into one of those module-specific valid ECC words. The other memory modules respond with the all zeros pattern, for example, and the entire ECC word appears valid to the memory controller in the host processor.

Referring to FIG. 3A, there are shown example operations for implementing enhanced ECC (Error Correction Codes) communications methods in the computer system 100 of FIGS. 1, 2A and 2B in accordance with preferred embodiments. Operations begin with a parity check matrix of error control code H as indicated in a block 300. The parity check matrix H is split into two halves, H0 and H1, one for each port A, B as indicated in a respective block 302, 304. The encoder of the preferred embodiment chooses, for the standard operation of the system, where the check bits go, as indicated by corresponding columns of the submatrices 306, 308 in the respective block 302, 304.

In particular, an encoder for the standard operation, i.e. when all the data is available in a central location, will ensure that the data and checks in the positions indicated by the columns of 306, 308 will have zero syndrome. A valid ECC word from the combination of port A 206 and port B 208, 206 is obtained by concatenating the encoding produced in module A, and a pre-defined constant (known to the module in port A) from the second port B, 208, such as all zeros, or some pattern combination of zeros and ones. To create the encoding in module A, an encoder places the data in columns other than the ones corresponding to the full rank 310 and inserts in the columns corresponding to the full rank matrix 310 bits that ensure that the entire word, resulting from concatenating the output of Port A and Port B, has zero syndrome. The contribution to the total syndrome by the Port B is zero if port B produces zeros, or at least, is a known constant if port B produces some known constant, since the product of a matrix H1 times a known constant is also a known constant. Therefore because of the full rank matrix 310, it is always possible to choose bits within Port A that create a total syndrome of zero. This entire procedure is can be done without changing the "official" location of the check bits in the memory controller's decoder, thereby gaining the ability to implement all this without changing the decoder at the memory controller.

An optional chip marking capability with a valid ECC word from the combination of port A 206 and port B 208, 206 that is obtained by concatenating the encoding produced H0 316 and checks 318 in Port A module, and with Port B module replies all zeroes H1 320 with marked symbols 322 (decoder treats as don't care) with full rank matrix 324 including checks 318 and marked symbols 322.

Sometimes, error correcting systems are equipped with a capability to "mark" or "erase" the contents of some received bits, effectively ignoring the value of those bits in the decoding of the word. When such capabilities are present, in the context of our invention, additional improvements are possible, for example, to increase the communication bandwidth or even enable the invention altogether. The key observation can be illustrated by means of an example. Suppose that the module in port A is the one that wants to communicate information back. As before, there is a prior agreement that whenever this is the case, the module in port B will send a pattern that is known to port A; for example the all zeros pattern. There is an additional pre-agreement: whenever the host wants status information back from port A, it will assume that some pre-agreed bits, not in port A, will be considered as erased by the decoder in the memory controller. Then, the module in port A considers as the bits that are erased in port B as bits where it can "write" check bits (even though it has no control over those, which will be reported, as, for example, all zeros by port B).

In the following discussion, units of bits are used, instead of symbols as done in a previous discussion, with the understanding that the statements give herein apply also to symbols by grouping bits into symbols.

Suppose that the number of bits erased in port B is e, and the number of rows in H is r. Then the module in port A no longer needs to find r columns that form a full rank matrix; instead, it finds r-e columns such that when together with the columns of the matrix H corresponding to the bits being erased in port B, form a full rank matrix. Port A then computes the bits that must go in the columns chosen in port A and place the in the corresponding locations. In principle, the module in port A would want to place specific bits in some locations in port B, but because these will be erased anyhow by the memory controller, it does not bother to do that. The final effect is that now more data bits can be sent by port A because the module in port A need only find r-e columns, instead of r columns. This improvement is particularly dramatic when the number of redundant bits r is bigger than the number of bits that are received from a port for the purposes of building a word to be ECC checked, because in this case, the previous proposal is not applicable. Nonetheless, if there are e bits that can be erased in another port(s), then we only need r-e bits in port A, and if e is large enough, the condition r-e<m can be satisfied, and hence the invention with the modification described herein is applicable.

In accordance with features of the invention, for example, when employing any Reed-Solomon code (regardless of symbol size) and whenever the number of checks r, for example, r=8 is no larger than the number of symbols in one memory module's ECC word minus 1, if we let the number of symbols in a memory module equal m, then the technique can send exactly m-r symbols worth of module-specific data for one ECC word, without any active coordination between the memory modules at the time of sending the information back, and regardless of where the symbols are located.

For example, assume a [72,64] 8-bit symbol Reed-Solomon code is being employed so there are 64 bytes of data and 8 bytes worth of checks, whose word is being split across two different ports, for a total of 36 bytes on each port. Initially, the data may have been laid out so that there are 32 bytes of data in port A, along with 4 check bytes for a total of 36 bytes, with a similar arrangement for port B. Assume that a request comes to Port A's port-specific address range. What a memory module in port A can do then is to send 36−8=28 bytes worth of module-specific data, along with 8 more bytes with checks. The role of these 8 byte checks is to ensure that the entire 72 byte word, with the 36 bytes from Port A and the other zeroed 36 bytes from port B, appears as a valid codeword.

This is always accomplished and feasible when employing any Reed-Solomon code (regardless of symbol size) and whenever the number of checks r (r=8 in our example) is no larger than the number of symbols in one memory module's ECC word minus 1. Moreover, if we let the number of symbols in a memory module equal m, then the technique described above can always manage to send exactly m-r symbols worth of module-specific data for one ECC word, without any active coordination between the memory modules at the time of sending the information back, and regardless of where the symbols are located.

Figure 3B:
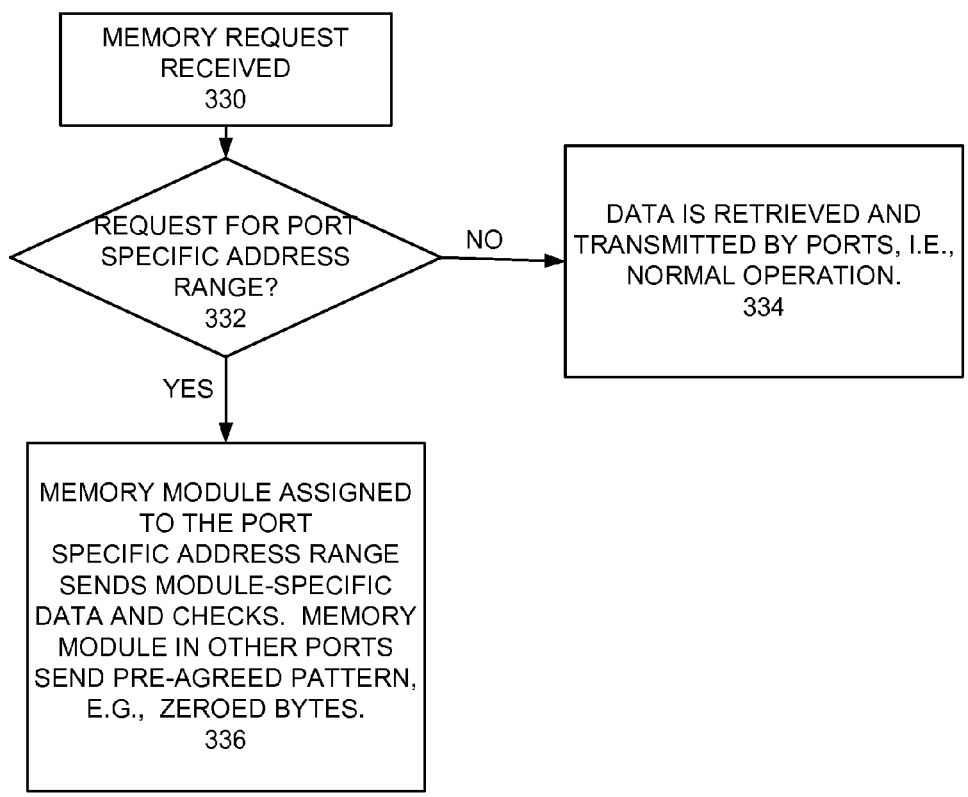

Referring to FIG. 3B, example operations are shown for implementing enhanced ECC (Error Correction Codes) communications methods in the computer system 100 of FIGS. 1, 2A and 2B in accordance with preferred embodiments. A memory request is received as indicated in a block 330. Checking to identify whether the request includes a port specific address range is performed as indicated in a decision block 332. If the request does not include port specific address range, then data is retrieved and transmitted by ports, i.e., normal operation, as indicated in a block 334. If the request includes a port specific address range, then the memory module assigned to the port specific address range module-specific data and checks, and the memory module in other ports sends the pre-agreed pattern, e.g., zeroed bytes, as indicated in a block 336.

In accordance with features of the invention, the ECC generation technique is not limited to Reed-Solomon codes. Fundamentally, if one has the (bit-wise) parity check matrix H of an error correcting code so that syndromes are obtained by multiplying H*v, where v is the received bit vector, and the parity check matrix H can be split in M sections, so that H=[H1 H2 . . . . HM], then for the ECC generation technique above to work, the fundamental requirement is that there exists an invertible square submatrix in each of the H1 H2 . . . HM with dimensions equaling the number of rows of H. The columns chosen, for example, the ith section of the parity check matrix H correspond to the locations where the ith module's check bits can be positioned.

Figure 3C:
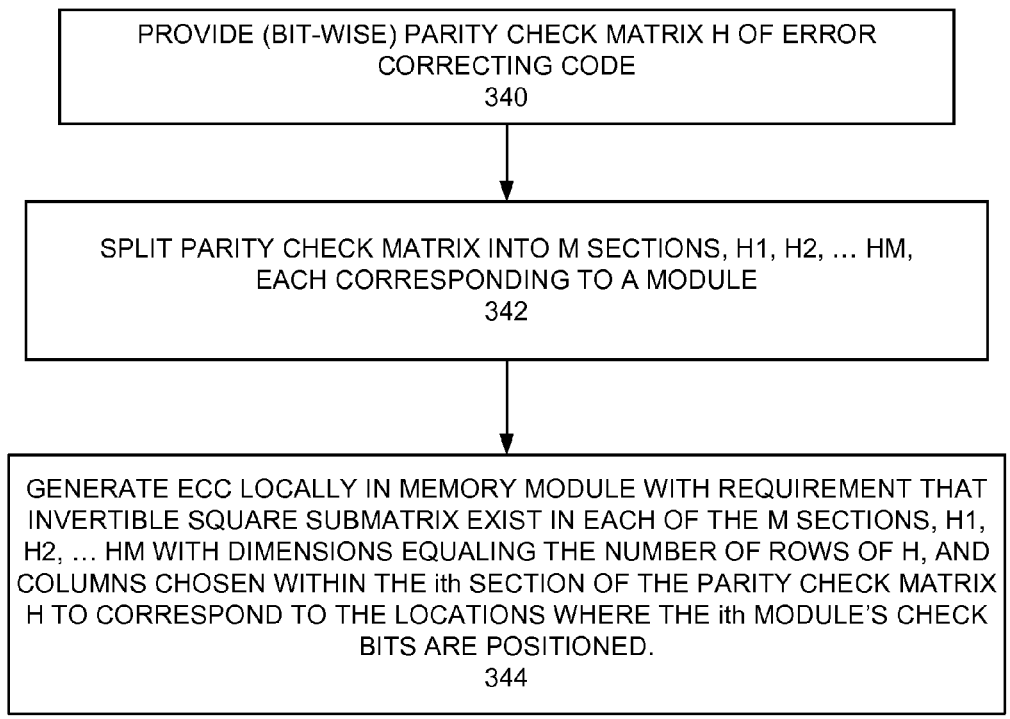

Referring to FIG. 3C, example operations are shown for implementing enhanced ECC (Error Correction Codes) communications methods in the computer system 100 of FIGS. 1, 2A and 2B in accordance with preferred embodiments where the ECC generation technique is not limited to Reed-Solomon codes. Initially a (bit-wise) parity check matrix H of an error correcting code is provided as indicated in a block 340. Then as indicated in a block 342 the parity check matrix H can be split in M sections, such that H=[H1 H2 . . . . HM], each corresponding to a module. Next the ECC is generated locally in the memory module as indicated in a block 344, the fundamental requirement is that there exists an invertible square submatrix in each of the H1 H2 . . . HM with dimensions equaling the number of rows of H and the columns chosen, for example, within the ith section of the parity check matrix H to correspond to the locations where the ith module's check bits are positioned.

For example, it is possible to transmit 28 bytes of information on each port through this technique, resulting in a 43.75% bandwidth efficiency. This bandwidth efficiency restriction applies only when module-specific information is to be sent back; whenever a normal access is made in which the data to be sent was previously encoded, taking advantage of the full memory bandwidth.

An additional important variant of the invention is that in some cases, the number of check symbols r may be larger than the number of symbols m in one memory module. Then the conditions described above would not apply. In particular, in a memory subsystem with a Redundant Array of Independent Memory (RAIM) arrangement, there is an entire memory module worth of redundancy, in addition to other redundancy, and thus trivially m-r is a negative number.

Nonetheless, there is still a method of the invention is provided for this case, under the condition that the memory controller has been equipped to be able to deal with symbols being marked, or treated as erasures, in the parlance of the standard coding theory terminology. For example, in the RAIM example, it is possible to mark all of the symbols corresponding to a memory port as items to be ignored, in addition to other marking possibilities.

The invention in the RAIM case is applied, for example, as follows. Whenever the host memory processor 102 makes a request for status from a specific memory port, then it assumes that some other pre-agreed memory module 106 will be treated as marked by the host memory processor. Therefore, when it is encoding its private data, it does not need to be burdened with the job of making the ECC word for that pre-agreed memory module all zeros because it knows ahead of time that the memory controller 104 will disregard the data coming from that memory module anyway. For example, with a RAIM system with 1 check symbol on the first 4 ports, and an entire module worth of check symbols in the 5th port, and a total of 9 symbols on each port, then by pre-agreeing that, for example, whenever memory module i (i=0,1,2,3,4) wants to communicate status back then memory module i+1 (mod 5) will be regarded as marked by the memory controller 104 then it is only burdened with making sure that 3 checks, each in the three remaining ports (not i or i+1 mod 5) are equal to zero. Therefore, it can send up to 9−1−3=5 symbols worth of data back to the host processor 102, for a total bandwidth efficiency of 4/64=6.25% when operating in this particular mode.

Figure 4:
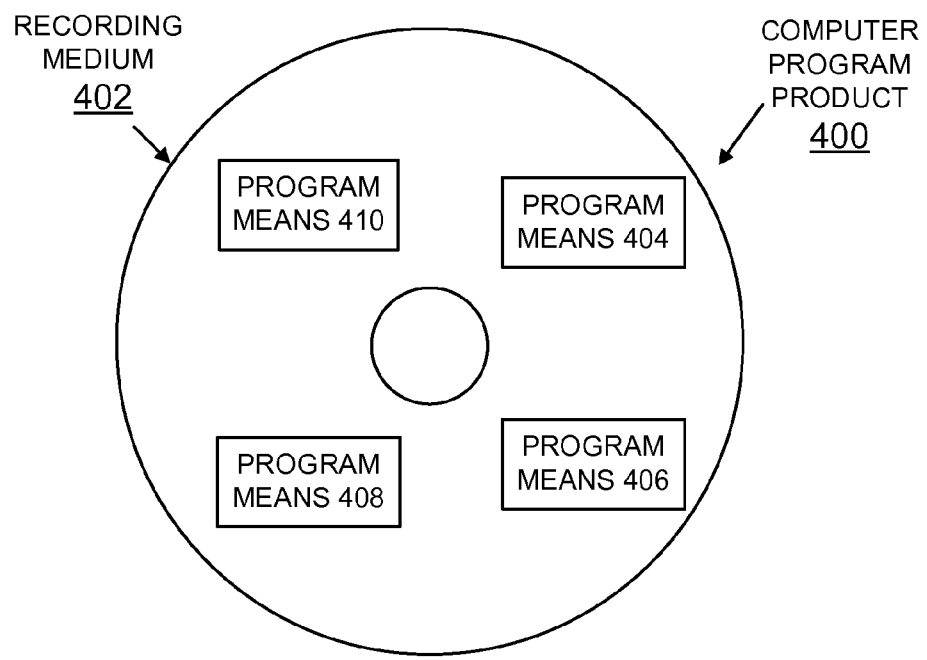
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. Recording medium 402 stores program means 404, 406, 408, and 410 on the medium 402 for carrying out the methods for implementing ECC (Error Correction Codes) communication methods of the preferred embodiment in the system 100 of FIGS. 1, 2A and 2B.

A sequence of program instructions or a logical assembly of one or more interrelated modules defined by the recorded program means 404, 404, 408, and 410, direct the computer system 400 for implementing ECC memory module communications with a host processor in multi-ported memory configurations of the preferred embodiment.

While the present invention has been described with reference to the details of the embodiments of the invention shown in the drawing, these details are not intended to limit the scope of the invention as claimed in the appended claims.

What is claimed is:

1. A method for implementing ECC (Error Correction Codes) memory module communications with a host processor in multi-ported memory configuration in a computer system comprising:

providing a memory controller coupled to the host processor and each of multiple memory modules, each of said multiple memory modules being assigned a module-specific pre-determined address range, said memory controller comprising an ECC generator and ECC decoder;

enabling each of said multiple memory modules operating in unison to identify one memory module required to communicate module specific information back to the host processor;

generating back to the host processor a valid ECC word with all of said multiple memory modules operating in unison, while other multiple memory modules individually being unaware of data contents of said one memory module required to communicate back to the host processor;

the host processor making a request in a particular module-specific pre-determined address range; and one of said multiple memory modules being assigned the particular module-specific pre-determined address range for the request communicating module specific information back to the host processor, said pre-agreed constant including a pattern combination of zeros and ones.

2. The method as recited in claim 1 includes using a Reed-Solomon code, a number r of checks, and a number m of symbols in a memory module, and wherein communicating module specific information back to the host processor includes sending m-r symbols of module-specific data for generating the valid ECC word.

3. The method as recited in claim 1 wherein generating back to the host processor a valid ECC word includes providing a parity check matrix H of an error correcting code.

4. The method as recited in claim 3 includes obtaining syndromes by multiplying the parity check matrix H of an error correcting code by a received bit vector v.

5. The method as recited in claim 1 includes using a number r of checks, a number m of symbols, and a capability to erase up to e symbols, wherein communicating module specific information back to the processor includes sending m-r-e symbols of module-specific data for generating the valid ECC word.

6. A system for implementing ECC (Error Correction Codes) memory module communications with a host processor in multi-ported memory configuration comprising:

a memory controller coupled to each of multiple memory modules, each of said multiple memory modules being assigned a module-specific pre-determined address range, and each of said multiple memory modules including a controller; said memory controller comprising an ECC generator and ECC decoder;

each of said multiple memory modules operating in unison being enabled to identify one memory module required to communicate module specific information back to the host processor;

all of said multiple memory modules operating in unison being enabled to generate back to the host processor a valid ECC word, while the multiple memory modules individually being unaware of data contents of the one memory module required to communicate back to the host processor;

includes the host processor making a request in a particular module-specific pre-determined address range; and one of said multiple memory modules being assigned the particular module-specific pre-determined address range for the request communicating module specific information back to the host processor for generating the valid ECC word; others of said multiple memory modules not assigned the particular module-specific pre-determined address range responding with a pre-agreed constant, said pre-agreed constant including a pattern combination of zeros and ones.

7. The system as recited in claim 6 includes control code stored on a computer readable medium, and wherein said control code directs the multiple memory modules to implement the ECC (Error Correction Codes) memory module communications with the host processor in multi-ported memory configurations.

8. The system as recited in claim 6 wherein said pre-agreed constant includes all zeros.

9. The system as recited in claim 6 wherein communicating module specific information back to the host processor for generating the valid ECC word includes using a Reed-Solomon code, a first number r of checks, and a second number m of symbols in a memory module, and wherein communicating module specific information back to the host processor includes sending m-r symbols of module-specific data for generating the valid ECC word.

10. The system as recited in claim 6 wherein communicating module specific information back to the host processor for generating the valid ECC word includes providing a parity check matrix H of an error correcting code.

* * * * *